A. EPPENS.
SACCHAROMETER.
APPLICATION FILED DEC. 31, 1912.
1,089,464.
Patented Mar. 10, 1914.
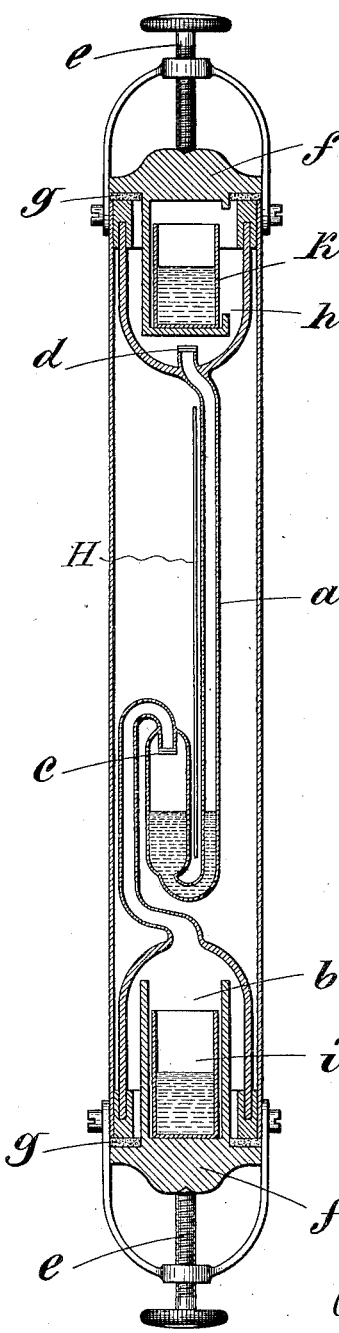
Witnesses;
Ray J. Ernst.
Clara Hohenstein
Inventor
August Eppens
By Knight Bro
attys

UNITED STATES PATENT OFFICE.

AUGUST EPPENS, OF BERLIN, GERMANY.

SACCHAROMETER.

1,089,464. Specification of Letters Patent. Patented Mar. 10, 1914.

Application filed December 31, 1912. Serial No. 739,542.

*To all whom it may concern:*

Be it known that I, AUGUST EPPENS, of Berlin, Kingdom of Prussia, German Empire, a subject of the King of Prussia, and whose post-office address is 146 Kurfürstenstrasse, Berlin, Kingdom of Prussia, German Empire, have invented new and useful Improvements in or Relating to Saccharometers, of which the following is a specification.

The known fermentation saccharometers, in which the sugar in the urine is measured by fermenting the sugar and reading the pressure or the quantity of the developed carbonic acid from a mercury manometer, possess a number of defects which have their origin with the use of mercury or other measuring liquid. They must be charged by the user personally, since the measuring liquid is liable to leak or to run out during transit while the urine and the fermenting substance are likely to come into contact with the measuring liquid, whereby the cleansing of the apparatus is rendered more difficult. The glycogen in the fermenting substance even if the urine is free from sugar causes the measuring liquid to rise and the regular zero in the event of variations to which it is very liable, can neither at all be restored or is established only with difficulty and without precision.

The present invention relates to a fermentation saccharometer by means of which the above drawbacks are avoided as a result of its peculiar construction, an example of which is illustrated in the accompanying drawing.

As shown, the measuring liquid is contained in a measuring tube $a$ in the rear of which a graduation may be provided. Against the space $b$ in which the urine sugar is subjected to fermentation the tube $a$ is closed by a plate, disk or other seal $c$, which is impermeable to the measuring liquid but is permeable to gases such as the carbonic acid produced by the fermentation, thereby preventing the measuring liquid from coming into contact at any time either with the urine or with the fermentation agent. In the other direction, the measuring tube is likewise closed by a similar seal $d$ so that the apparatus may be carried about or transported in any position without enabling the measuring liquid to run out. Against the atmosphere the space $b$ is closed by a plug or plate $f$ and a packing $g$ of rubber, leather, or similar material. By means of a screw $e$ acting on the plug $f$ more or less contraction of the space in the chamber $b$ due to the compression of the packing $g$, may at will be exerted, thereby varying the pressure in this chamber and causing the measuring liquid to rise in a corresponding degree. Consequently by tightening the screw $e$ more or less the level of the measuring liquid can always be set at zero with the greatest precision. The effects in the apparatus caused by the glycogen of the fermentation substance contained in a glass $i$ are equalized by the provision above the measuring liquid of a second fermentation chamber $h$ charged for the measuring operation with the same quantity of fermenting substance likewise in a glass $k$ and the same quantity of liquid as the chamber $b$, the liquid chosen being preferably water or any other liquid free from sugar. The quantity of carbonic acid generated in the chamber $h$ is thus equal to that produced in chamber $b$ by the glycogen in the fermenting medium and their actions on the measuring liquid are therefore equalized. The chamber $h$ is closed against the atmosphere in a similar manner as the chamber $b$ by a rubber packing $g$ and plug $f$ with adjusting screw $e$ so that by varying the pressure at this point the zero can likewise be precisely regulated. The portability of the apparatus may still further be facilitated by securing the measuring tube with its two enlargements which form the fermentation chambers in a tube of metal or other suitable material by means of plaster or the like.

What I do claim as my invention, and desire to secure by Letters Patent of the United States, is:—

1. In a saccharometer the combination of a mercury manometer, a fermentation chamber connected thereto at one end, means impermeable to liquid but permeable to gases interposed between the said manometer and the fermentation chamber at that end and a fermentation chamber connected to the said manometer at its other end, substantially as set forth.

2. In a saccharometer the combination of a mercury manometer, a fermentation chamber connected thereto at one end, means impermeable to liquid but permeable to gases interposed between the said manometer, a fermentation chamber connected to the said manometer at its other end and means interposed at this end between the manometer and the said second fermentation chamber so as to form a seal impermeable to liquids but permeable to gases, all substantially as set forth.

3. In a saccharometer the combination of a mercury manometer, a chamber for fermenting liquid, a seal impermeable to said liquid and mercury, but permeable to gases arising from said fermenting liquid interposed between the said manometer and the said fermentation chamber and means for closing the fermentation chamber against the atmosphere and for enabling the pressure in the fermentation chamber to be varied, substantially as and for the purpose set forth.

4. In a saccharometer the combination of a mercury manometer, a fermentation chamber connected to each end of the said manometer, means impermeable to liquid but permeable to gases interposed at each end between the said manometer and the corresponding fermentation chamber and means for closing each fermentation chamber against the atmosphere and for varying the pressure therein, all substantially as and for the purpose set forth.

5. In a saccharometer the combination of a mercury manometer, a fermentation chamber connected thereto, means impermeable to liquid but permeable to gases interposed between the said manometer and the said fermentation chamber, an elastic washer and a plate for closing the said fermentation chamber against the atmosphere and an adjusting screw acting on the said plate and enabling the pressure in the fermentation chamber to be varied and the level of the measuring liquid to be adjusted at will, substantially as described.

6. In a saccharometer the combination of a mercury manometer, a fermentation chamber connected to each end of the said manometer, means impermeable to liquid but permeable to gases interposed at each end between the said manometer and the said fermentation chamber, an elastic washer, a plate and an adjusting screw for closing each fermentation chamber against the atmosphere and for varying the pressure in the said fermentation chamber, all substantially as described and shown.

In testimony whereof I have hereunto set my hand in presence of two subscribing witnesses.

Dr. AUGUST EPPENS.

Witnesses:
Woldemar Haupt,
Henry Hasper.